(12) United States Patent
Shuttleworth et al.

(10) Patent No.: US 7,162,846 B2
(45) Date of Patent: Jan. 16, 2007

(54) JOINT STRUCTURE FOR LIQUID OR SEMI-LIQUID SEALANT

(75) Inventors: Adam Joe Shuttleworth, Denver, IA (US); Robert Eugene Lorentzen, Sturgeon, MO (US)

(73) Assignee: Deere & Company, Moline, IL (US)

( * ) Notice: Subject to any disclaimer, the term of this patent is extended or adjusted under 35 U.S.C. 154(b) by 504 days.

(21) Appl. No.: 10/617,365

(22) Filed: Jul. 10, 2003

(65) Prior Publication Data

US 2005/0005552 A1    Jan. 13, 2005

(51) Int. Cl.
*E04B 2/00* (2006.01)
(52) U.S. Cl. .................. 52/582.1; 52/592.1; 52/591.3
(58) Field of Classification Search ............. 52/578, 52/582.1, 592.1, 592.2, 591.3
See application file for complete search history.

(56) References Cited

U.S. PATENT DOCUMENTS

| | | | | |
|---|---|---|---|---|
| 3,192,805 A | * | 7/1965 | Manning ..................... | 81/414 |
| 3,200,553 A | * | 8/1965 | Frashour et al. ............ | 52/592.4 |
| 3,347,048 A | * | 10/1967 | Brown et al. ................ | 405/16 |
| 3,476,277 A | * | 11/1969 | Rownd ....................... | 215/12.1 |
| 3,562,989 A | * | 2/1971 | Gregoire ..................... | 52/279 |
| 3,778,342 A | * | 12/1973 | Charbonneau ............... | 162/352 |
| 2002/0046526 A1 | * | 4/2002 | Knauseder ................... | 52/581 |
| 2004/0128934 A1 | * | 7/2004 | Hecht ......................... | 52/578 |

* cited by examiner

*Primary Examiner*—Naoko Slack
*Assistant Examiner*—Chi Q. Nguyen

(57) ABSTRACT

A joint structure for a liquid or semi-liquid sealant is provided to facilitate the sealing engagement of plural structural members without having sealant protruding from the joint in a visible area. The joint structure comprises a first structural member having a channel with a first wall, a second wall generally opposite the first wall and a third wall connecting the first and second walls. The third wall is disposed at an acute angle to the first wall and at an obtuse angle to the second wall. A second structural member has a tongue portion for matably engaging the channel of the first structural member. The tongue portion has a first wall, a second wall generally opposite the first wall, and a third wall connecting the first and second walls. The third wall is disposed at an obtuse angle to the first wall and at an acute angle to the second wall. The angle of the third wall of the channel is opposite that of the third wall of the tongue portion, such that a cross-sectional area between the tongue portion and the channel is larger on one side than on the other when the tongue portion is matably received in the channel. Accordingly, a bead of sealing material can be applied between the channel and the tongue portion and excess sealing material is directed toward the larger side of the cross-sectional area.

10 Claims, 2 Drawing Sheets

JOINT STRUCTURE FOR LIQUID OR SEMI-LIQUID SEALANT

FIELD OF THE INVENTION

The present invention relates generally to structures wherein plural parts must be mated and sealed together to form a structural member. More particularly, the present invention relates to the mating joint between the parts used to form the structural member. Specifically, the present invention relates to such joints wherein a liquid or semi-liquid sealant is employed to provide sealing between the parts used to form the structural member.

BACKGROUND OF THE INVENTION

It is well known to join plural parts together to form structural members. More particularly, it is known to utilize separately formed body panel members to form enclosures such as operators cabs for work vehicles and the like. These body panel members are frequently compression molded or rotationally molded from thermoplastic or thermoset materials. Such panels are then joined together to form structural members such as roofs or sidewalls, so as to provide a strong, durable structure which may have wiring, insulation, ventilation ducts etc. installed between the panels. In the construction of such structures it is frequently necessary to employ some type of seal between the panels to limit the movement of air and/or entry of moisture so as to provide a desired level of weather-proofing. The use of liquid or semi-liquid mastic sealant is well known for such purposes. Typically the panels will be formed having a tongue-in-groove or similar configuration at the joint location, into which a sealant is introduced prior to the panels being joined. One major drawback of such methods is that when the parts are joined the sealant is compressed and a certain amount of sealant is squeezed out of the joint. In the construction of vehicle body panels in particular, it is undesirable to have sealant protruding out from the joint in areas where it can be seen. For example, in the construction of a two-piece roof member it may be acceptable to have sealant protruding from the joint on the inside of the roof structure i.e. between the panels where it cannot be seen, but it is undesirable to have the sealant protruding from the joint on the outside which is visible to the end user of the product. Accordingly, there is a clear need in the art for a joint design which limits the amount of excess sealant that is squeezed out of the joint on the visible side of the structure by directing the flow of excess sealant in one direction.

SUMMARY OF THE INVENTION

In view of the foregoing, it is an object of the invention to provide a means for joining plural structural members.

Another object of the invention is the provision of a means for sealingly joining structural members.

A further object of the invention is to provide a joint structure which prevents sealing material from protruding from a visible side of the joint when the plural structural members are sealingly mated.

An additional object of the invention is the provision of a joint structure which facilitates flow of sealant in a first direction and limits flow of sealant in a second direction.

The foregoing and other objects of the invention together with the advantages thereof over the known art which will become apparent from the detailed specification which follows are attained by a joint structure for a liquid or semi-liquid sealant comprising: a first structural member having a channel, the channel having a first wall, a second wall generally opposite the first wall and a third wall connecting the first and second walls, the third wall being disposed at an acute angle to the first wall and at an obtuse angle to the second wall; a second structural member having a tongue portion for matably engaging the channel of the first structural member, the tongue portion having a first wall, a second wall generally opposite the first wall, and a third wall connecting the first and second walls, the third wall being disposed at an obtuse angle to the first wall and at an acute angle to the second wall, the angle of the third wall of the channel being opposite that of the third wall of the tongue portion.

Other objects of the invention are attained by a joint structure for a liquid or semi-liquid mastic sealant comprising: a first structural member having a channel, the channel having a first wall, a second wall generally opposite the first wall and a third wall connecting the first and second walls, the third wall being disposed at an acute angle to the first wall and at an obtuse angle to the second wall; a second structural member having a tongue portion for matably engaging the channel of the first structural member, the tongue portion having a first wall, a second wall generally opposite the first wall, and a third wall connecting the first and second walls, the third wall being disposed at an obtuse angle to the first wall and at an acute angle to the second wall, the angle of the third wall of the channel being opposite that of the third wall of the tongue portion such that a cross-sectional area between the tongue portion and the channel is larger on one side than on the other when the tongue portion is matably received in the channel so that a bead of sealing material can be applied between the channel and the tongue portion and excess sealing material is directed toward the larger side of the cross-sectional area.

In general, a joint structure for a liquid or semi-liquid sealant is provided to facilitate the sealing engagement of plural structural members without having sealant protruding from the joint in a visible area. The joint structure comprises a first structural member having a channel with a first wall, a second wall generally opposite the first wall and a third wall connecting the first and second walls. The third wall is disposed at an acute angle to the first wall and at an obtuse angle to the second wall. A second structural member has a tongue portion for matably engaging the channel of the first structural member. The tongue portion has a first wall, a second wall generally opposite the first wall, and a third wall connecting the first and second walls. The third wall is disposed at an obtuse angle to the first wall and at an acute angle to the second wall. The angle of the third wall of the channel is opposite that of the third wall of the tongue portion, such that a cross-sectional area between the tongue portion and the channel is larger on one side than on the other when the tongue portion is matably received in the channel. Accordingly, a bead of sealing material can be applied between the channel and the tongue portion and excess sealing material is directed toward the larger side of the cross-sectional area.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
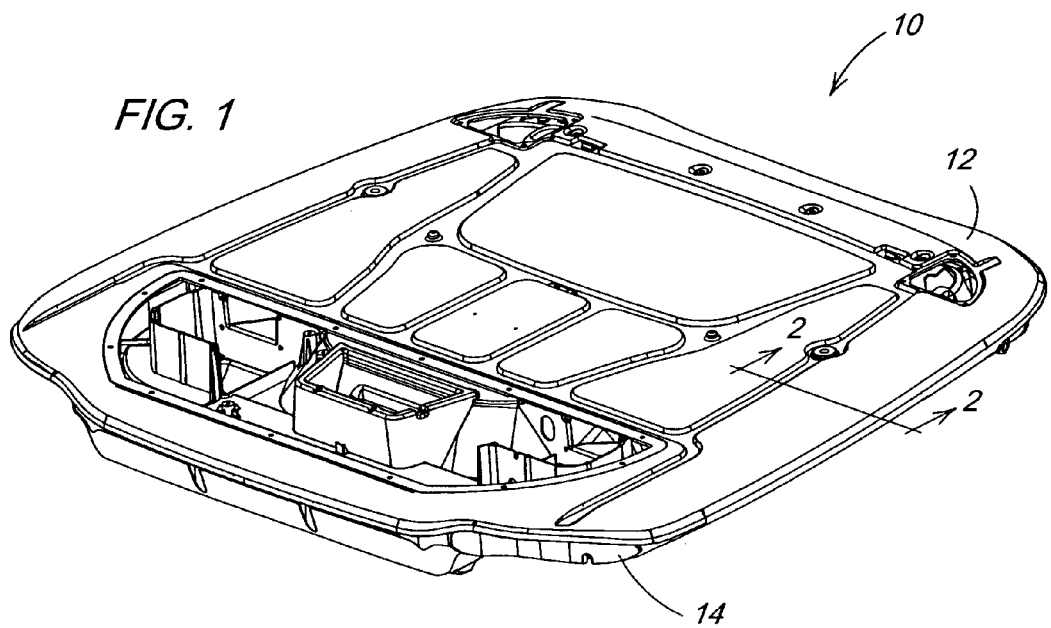
FIG. 1 is a perspective view of a representative vehicle roof structure embodying the concepts of the invention.
Figure 2:
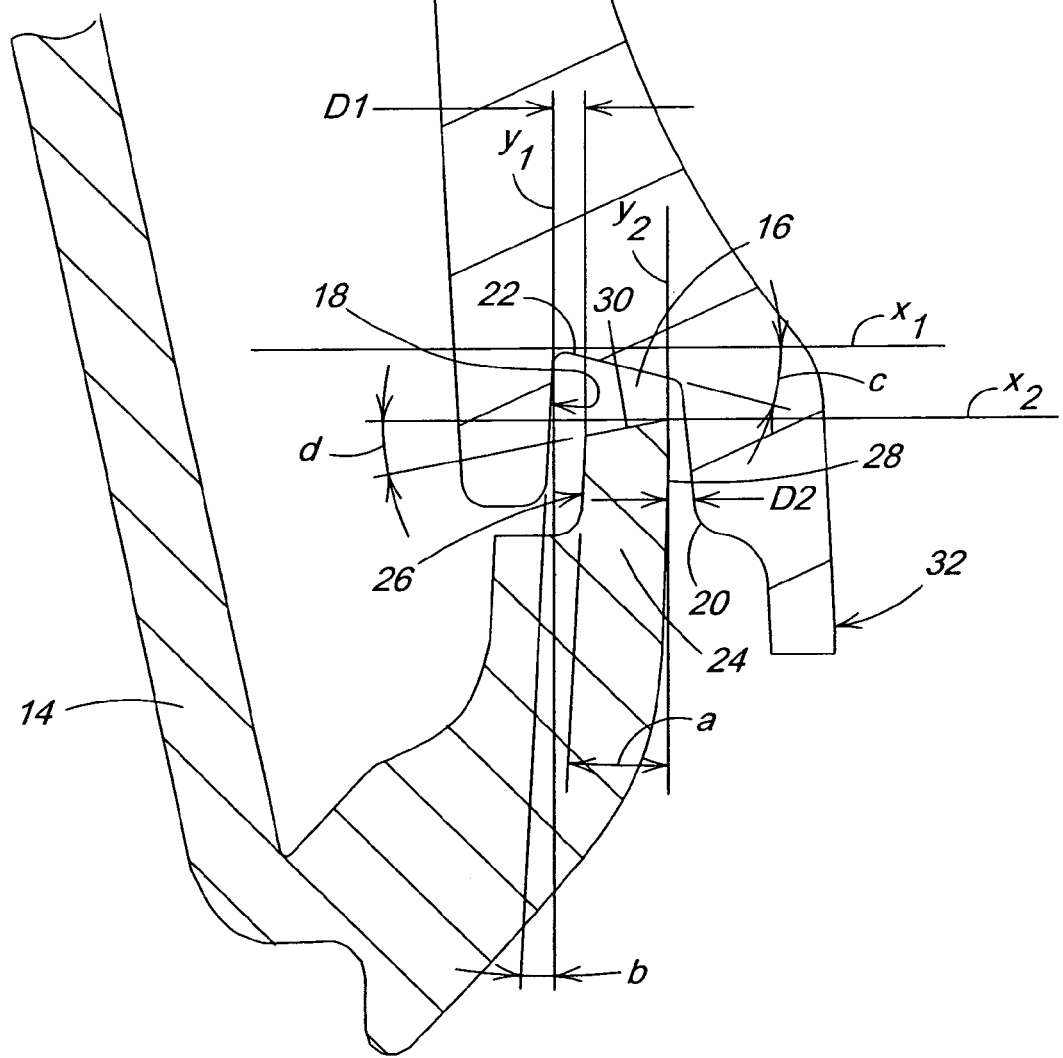
FIG. 2 is a cross-sectional view of the structure of FIG. 1 taken along the line 2—2.

With reference to FIGS. 1 and 2 it will be seen that a representative structure utilizing the joint of the present invention is designated generally by the numeral 10. Such a structure 10 may be in the form of a two-piece roof for a vehicle or the like and is comprised of a first panel 12 and a second panel 14. As can be seen first panel 12 includes a channel 16 having a first wall 18, a second wall 20 generally opposite the first wall 18 and a third wall 22 connecting the first and second walls 18 and 20 respectively. Third wall 22 is disposed at an acute angle to first wall 18 and is disposed at an obtuse angle to second wall 20. Similarly, second panel 14 includes a tongue portion 24 intended to matingly engage the channel 16 of the first panel member 12, and accordingly includes a first wall 26, a second wall 28 generally opposite first wall 26, and a third wall 30 connecting first and second walls 26 and 28 respectively. Third wall 30 is disposed at an obtuse angle to first wall 26 and at an acute angle to second wall 28.

For purposes of illustration the various angles employed in the joint of the present invention will be hereinafter described with respect to horizontal axes $X_1$ and $X_2$ and vertical axes $Y_1$ and $Y_2$. References to the horizontal and the vertical are made only with respect to the axes of FIG. 2, and are for the purpose of illustrating the relationship of angles to one another. Those skilled in the art will recognize that such references are not intended to suggest the overall orientation of a structure employing the invention when such a structure is in use. In the preferred embodiment illustrated it will be seen that first wall 26 of tongue portion 24 varies from the vertical axis $Y_2$ by approximately 3°. This angle is labeled (a) in FIG. 2. Likewise first wall 18 of channel 16 varies from the vertical axis $Y_1$ by approximately 3°. This angle is labeled (b) in FIG. 2. Third wall 22 of channel 16 varies from the horizontal axis $X_1$ by approximately 15°. This angle is designated (c) in FIG. 2. Similarly, third wall 30 of tongue portion 24 varies from the horizontal axis $X_2$ by approximately 11°. This angle is designated as (d) in FIG. 2. The importance of the labeled angles will become apparent as the detailed description continues.

Figure 3:
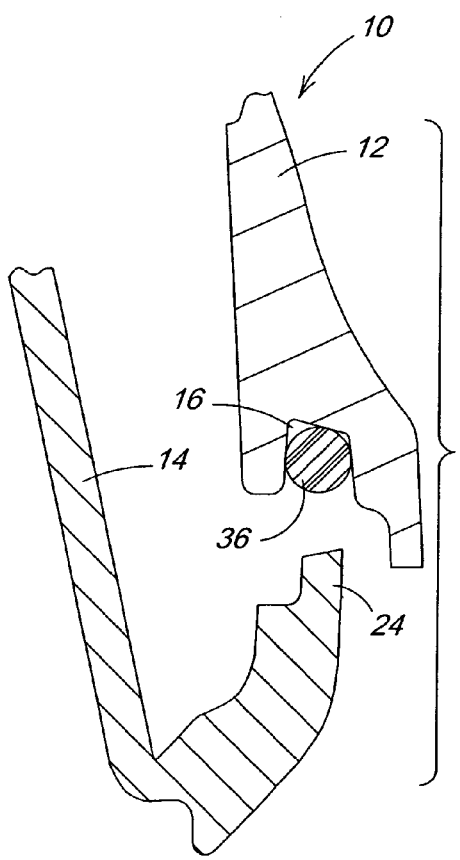
FIG. 3 is an enlarged view of the joint of FIG. 2 wherein the structural members are disassembled and a bead of sealant is applied to the joint.
Figure 4:
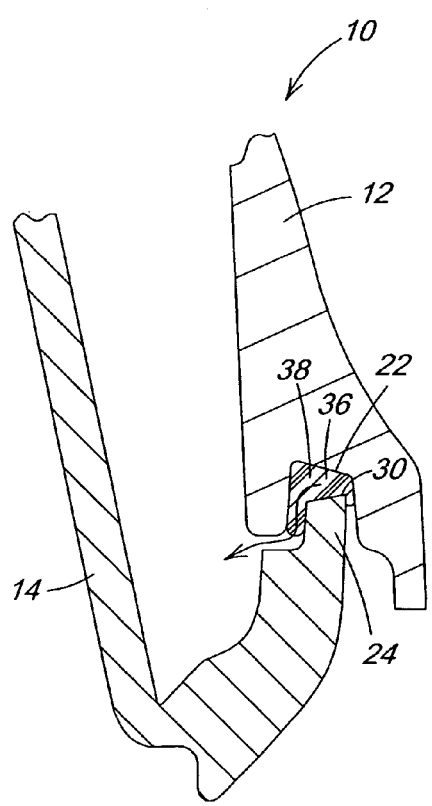
FIG. 4 is the joint of FIG. 3 wherein the structural members are assembled and the sealant is compressed.

It should be noted that surface 32 of first panel member 12 and surface 34 of second panel member 14 represent the exterior of the exemplary structure 10 embodying the invention and thus it is these areas that would be visible to the end user of the product. Accordingly, it is desired to prevent sealant from protruding out of the joint in the area between second wall 20 of the channel 16 and second wall 28 of the tongue portion 24. The joint configuration of the present invention significantly reduces the amount of liquid or semi-liquid sealant which enters this area when the panel members 12 and 14 are mated. Specifically, the angles previously discussed ensure that excess sealant is forced into the area between third wall 22 of channel 16 and third wall 30 of tongue portion 24 and/or the area between first wall 18 of channel 16 and first wall 26 of tongue portion 24. This is best illustrated in FIGS. 3 and 4. As shown in FIG. 3 a bead 36 of liquid or semi-liquid mastic sealant is applied along the channel 16 prior to mating the panels 12 and 14. The panels 12 and 14 are then mated such that the tongue portion 24 of panel 14 engages the channel 16 of panel 12. As shown in FIG. 4 when the panels 12 and 14 are brought together, the third wall 30 of tongue portion 24 comes into contact with the sealant bead 36. As the space between the panels decreases the sealant is compressed and must flow somewhere. Because the angle of the third wall 22 of channel 16 is opposite that of third wall 30 of tongue portion 24, the cross-sectional area 38 between the tongue portion 24 and channel 16 is larger on the side most proximal to the interior of the joined panels and smaller on the side most proximal to the exterior of the joined panels. Accordingly, a larger flow area is available in the direction of the arrow of FIG. 4 which reduces the pressure required to cause the sealant material to flow. Conversely, a smaller flow area is available in the opposite direction of the arrow and more pressure is required to cause flow in that direction. Thus, as the panels are brought into their final position the bulk of excess sealant material is forced to flow in the direction of the arrow and does not protrude into the area between third wall 22 of channel 16 and third wall 30 of tongue portion 24 to the extent that it can be seen.

Those skilled in the art will recognize that the amount of excess sealant material is directly related to the amount originally applied to the joint. Likewise the amount of sealant material required to seal the joint is directly related to the overall size of the joint structure. Thus a certain amount of experimentation will be required to determine the optimal amount of sealant for a given sized structure while taking into account the physical properties of the particular sealant material chosen. The design of the joint according to the invention will significantly reduce the amount of excess sealant material which will protrude from the joint over a broad range of structural sizes and different sealing material properties, however in order to optimize the performance of the invention it is important to observe certain guidelines with respect to the relationship of the tongue portion 24 and the channel 16. More particularly, the distance between the first wall 18 of channel 16 and first wall 26 of tongue portion 24 (designated $D_1$ in FIG. 2) should be at least twice the distance between second wall 20 of channel 16 and second wall 28 of tongue portion 24 (designated $D_2$ in FIG. 2). Further, angle (a) should be generally parallel with and equal to or greater than angle (b), with both angles (a) and (b) being at least 2°. Similarly, angle (c) should always be greater than angle (d) by at least 2° with angle (d) being at least 10°. If these parameters are observed the invention will perform optimally for directing the flow of excess sealing material in the direction of the arrow in FIG. 4 while permitting a minimal amount of sealant material to flow in the opposite direction.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A joint structure for a liquid or semi-liquid mastic sealant comprising:
   a first structural member having a channel, the channel having a first wall, a second wall generally opposite the first wall and a third wall connecting the first and second walls, the third wall being disposed at an acute angle to the first wall and at an obtuse angle to the second wall;
   a second structural member having a tongue portion for matably engaging the channel of the first structural member, the tongue portion having a first wall disposed adjacent to the first wall of the first structural member when the structural members are mateably engaged, a second wall generally opposite the first wall the second wall being disposed adjacent to the second wall of the first structural member when the structural members are mateably engaged, and a third wall connecting the first and second walls, the third wall being disposed at an obtuse angle to the first wall and at an acute angle to the second wall the third wall being disposed adjacent to the third wall of the first structural member when the structural members are mateably engaged, the angle of the third wall of the channel being opposite that of the third wall of the tongue portion so that a cross-sectional area of a gap between the channel and the tongue is larger on a side nearest the first walls of the channel and tongue than on a second side nearest the second walls of the channel and tongue.

2. A joint structure for a liquid or semi-liquid sealant as described in claim 1 wherein a distance between the first wall of the channel and the first wall of the tongue portion is at least twice the distance between the second wall of the channel and the second wall of the tongue portion.

3. A joint structure for a liquid or semi-liquid sealant as described in claim 1 wherein the angle of the first wall of the tongue portion is parallel with and equal to the angle of the first wall of the channel.

4. A joint structure for a liquid or semi-liquid sealant as described in claim 1 wherein the angle of the first wall of the tongue portion is greater than the angle of the first wall of the channel.

5. A joint structure for a liquid or semi-liquid sealant as described in claim 1 wherein the angle of the third wall of the channel is greater than the angle of the third wall of the tongue portion by at least 2°.

6. A joint structure for a liquid or semi-liquid mastic sealant comprising:
   a first structural member having a channel, the channel having a first wall, a second wall generally opposite the first wall and a third wall connecting the first and second walls, the third wall being disposed at an acute angle to the first wall and at an obtuse angle to the second wall;
   a second structural member having a tongue portion for matably engaging the channel of the first structural member, the tongue portion having a first wall, a second wall generally opposite the first wall, and a third wall connecting the first and second walls, the third wall being disposed at an obtuse angle to the first wall and at an acute angle to the second wall, the angle of the third wall of the channel being opposite that of the third wall of the tongue portion such that a cross-sectional area between the tongue portion and the channel is larger on one side than on the other when the tongue portion is matably received in the channel so that a bead of sealing material can be applied between the channel and the tongue portion and excess sealing material is directed toward the larger side of the cross-sectional area.

7. A joint structure for a liquid or semi-liquid sealant as described in claim 6 wherein a distance between the first wall of the channel and the first wall of the tongue portion is at least twice the distance between the second wall of the channel and the second wall of the tongue portion.

8. A joint structure for a liquid or semi-liquid sealant as described in claim 7 wherein the angle of the third wall of the channel is greater than the angle of the third wall of the tongue portion by at least 2°.

9. A joint structure for a liquid or semi-liquid sealant as described in claim 8 wherein the angle of the first wall of the tongue portion is parallel with and equal to the angle of the first wall of the channel.

10. A joint structure for a liquid or semi-liquid sealant as described in claim 8 wherein the angle of the first wall of the tongue portion is greater than the angle of the first wall of the channel.

* * * * *